United States Patent Office 2,731,387
Patented Jan. 17, 1956

2,731,387

AQUEOUS SUSPENSION OF PROCAINE PENICILLIN

Ernst Auhagen and Klaus Bauer, Wuppertal-Elberfeld, Germany, assignors to Schenley Industries, Inc., New York, N. Y., a corporation of Delaware No Drawing. Application May 13, 1952, Serial No. 287,598

Claims priority, application Germany May 15, 1951

6 Claims. (Cl. 167—65)

This invention relates generally to penicillin-containing compositions and, more particularly, it is concerned with certain novel, free-flowing aqueous suspensions of a water-insoluble penicillin salt, present in the suspensions in an unusually large proportion.

It is known that water-insoluble salts of penicillin can be suspended in aqueous media in minor concentrations sufficient, however, for certain therapeutic purposes. For instance, a composition comprising about ten per cent by weight of finely ground procaine penicillin suspended in an aqueous medium can be prepared readily and has sufficient fluidity to permit it to be administered by injection. Heretofore, attempts to produce suspensions, in aqueous media, containing higher concentrations of the insoluble penicillin salt have resulted in suspensions that are insufficiently fluid and too pasty for administration by injection.

It has been proposed to prepare procaine penicillin suspensions having higher concentrations of the antibiotic agent through use of an alkali salt of penicillin in the procaine penicillin suspension and such suspensions have sufficient fluidity for injection purposes, even when the procaine salt is present to the extent of about fifty per cent by weight of the mixture. However, suspensions of this type lose their activity, at least partially, when stored, due to decomposition of the alkali penicillin salt in the solution, and it has been necessary, therefore, when using suspensions of this type, to prepare the suspension freshly in each instance, immediately before it is to be administered.

An object of this invention is to provide stable aqueous suspensions of water-insoluble penicillin salts that contain a major proportion of one or more of these salts, which are stable upon storage and which have fluidity sufficient to suit them to administration by injection.

In accordance with this invention, stable aqueous suspensions containing a high concentration of finely divided water-insoluble penicillin salts are provided by dissolving in the aqueous components of such suspensions relatively minor proportions, say at most about one percent by weight, of purified water-soluble ox bile as such or ox bile compounds or derivatives, preferably salts, of cholanic acid type substances such as the hydroxycholanic and ketocholanic acids derived from ox bile (Fel tauri depuratum). Although ox bile, as such, and salts or mixtures of salts of any of the several bile acids may be used in practice of this invention, those substances chiefly preferred are purified ox bile itself and the alkali-metal salts of lithocholic acid (3-hydroxycholanic acid), desoxycholic acid (3:12-dihydroxycholanic acid), chendesoxycholic acid (3:7-dihydroxycholanic acid), and cholic acid (3:7:12-trihydroxycholanic acid), the second mentioned being the most preferred.

In accordance with this invention, free-flowing stable aqueous suspensions of water-insoluble penicillin salts are provided, containing much higher concentrations of the penicillin salt than may be suspended in water (at most, about 10% by weight) and much higher than may be achieved through use of other emulsifying or wetting agents, for instance, sorbitan monooleate ("Tween 80").

For example, the improvement effected by use of the bile products over the type of product utilizing sorbitan monooleate may be readily demonstrated by stirring together in a suitable small container, 0.4 gram of "ultragrind" procaine penicillin particles and 0.8 cc. of the solution under test, then, so far as possible, pouring out the contents of the container and weighing any residual material that remains. When pure water is used in this test, none of the container contents can be poured out and the residue, therefore, equals the initial weight of the contents. Using aqueous sorbitan monooleate solutions of the concentrations indicated, the following data are obtained, the residue weight being expressed as a percentage of the initial weight of the container contents:

| Concentration | Residue Weight |
|---|---|
| Percent | Percent |
| 0.2 | 100 |
| 1.0 | 56 |
| 10 | 50 |

Using an aqueous ox bile solution of 1% concentration, the residue weighed 43% merely, which is better than was achieved in any of the foregoing tests, but when using aqueous solutions of sodium desoxycholate of the concentrations indicated, the improvement was even more marked, as is shown by the following data:

| Concentration | Residue Weight |
|---|---|
| Percent | Percent |
| 0.2 | 100 |
| 0.5 | 41 |
| 0.7 | 12 |
| 1.0 | 8 |

It will be obvious from these data that it is possible to prepare suspensions by use of ox bile or sodium desoxycholate having a degree of fluidity that is wholly unattainable when using sorbitan monooleate.

The penicillin salt suspensions according to this invention may be prepared by grinding together the water-insoluble penicillin salt and the ox bile product, then adding the mixture to water in such proportions as to produce a suspension of the concentration desired or needed. Alternatively, the water-insoluble penicillin salt may be ground, then suspended in a previously prepared aqueous solution of the ox bile product or the ox bile product, in dry state, may be added to an aqueous slurry of the ground penicillin salt. In each instance a stable suspension is obtained, having satisfactory fluid characteristics permitting it to be used for parenteral administration by means of a hypodermic syringe.

While the proportions of the components of the suspension are not critical, the ox bile product should be present in the aqueous mixture in a concentration of more than 0.1 and up to about 1.0 per cent by weight, depending upon the particle size of the water-insoluble penicillin salt being incorporated in the suspension and the degree of fluidity desired in the product.

A remarkable property of the penicillin salt suspensions according to this invention is that they do not foam when shaken, thus facilitating charging of the injection syringe without observing special precautions to avoid drawing in air bubbles that it would be difficult subsequently to discharge without loss of the medicament.

It will be understood by those versed in the field to which this invention relates that buffers, such as are included conventionally in procaine penicillin suspensions, may also be added to the compositions of this invention. Suitable substances for this purpose are, for instance, sodium citrate and sodium phosphate. Likewise, if desired, viscosity-modifying agents may be included in the compositions, for instance, polyvinylpyrrolidone, cellulose esters, algin, tragacanth or acacia may be used for this purpose.

To facilitate a better understanding of the subject matter of this invention, five specific examples herewith follow. It is clearly to be understood that these examples are provided by way of illustration, merely, and are not to be construed as limitations upon the scope of this invention.

*Example 1*

About 1 part by weight of the procaine salt of penicillin is mixed with about 2 parts by weight of a 0.2 percent aqueous solution of purified ox-bile. A fluid suspension, suitable for parenteral administration by injection, is obtained. Although this suspension is unusually stable when stored under ordinary conditions, if desired, viscosity-modifying colloids, such as sodium carboxymethyl cellulose or the like, and buffer substances, conventionally included in procaine penicillin suspensions, may be added.

*Example 2*

Approximately 1 part by weight of the procaine salt of penicillin is suspended in about 2 parts by weight of a 0.2 percent aqueous solution of purified ox-bile and containing, also, about 0.5 percent of polyvinylpyrrolidone. A stable fluid suspension, suitable for administration by injection, is thus obtained.

*Example 3*

Approximately 1 part by weight of the procaine salt of penicillin is suspended in about 2 parts by weight of a 0.7 percent solution of the sodium salt of desoxycholic acid. A stable fluid suspension, suitable for administration by injection, is thus obtained.

*Example 4*

Approximately 1 part by weight of the procaine salt of penicillin is suspended in about 2 parts by weight of an aqueous solution containing 0.2 percent by weight of purified ox-bile and 0.1 percent of gum arabic. A stable fluid suspension, suitable for administration by injection, is thus obtained.

*Example 5*

Approximately 1 part by weight of the 3-n-butoxy-N-isobutylbenzylamine salt of penicillin is suspended in about 4 parts by weight of an aqueous solution containing 1% by weight of purified ox-bile (Fel tauri depuratum). A stable fluid suspension, suitable for administration by injection, is thus obtained.

Having thus described the subject matter of this invention, what it is desired to secure by Letters Patent is:

1. An aqueous suspension comprised of finely divided particles of the procaine salt of penicillin in which the proportion of salt materially exceeds about 10% by weight of the total weight of the suspension, characterized by improved fluidity and substantial stability of antibiotic potency when stored under ordinary conditions, that comprises additionally, in solution in the aqueous component of the suspension, a purified salt of a bile acid derived from hydrolyzed ox-bile.

2. An aqueous suspension comprised of finely divided particles of the procaine salt of penicillin in which the proportion of salt present in the suspension materially exceeds about 10% by weight of the total weight of the suspension, characterized by improved fluidity and substantial stability of antibiotic potency when stored under ordinary conditions, that comprises additionally, in solution in the aqueous component of the supsension, a purified alkali-metal salt of a bile acid derived from hydrolyzed ox-bile.

3. An aqueous suspension as defined in claim 2 wherein the alkali-metal salt is sodium desoxycholate.

4. An aqueous suspension comprised of finely divided particles of the procaine salt of penicillin in which the proportion of salt present in the suspension materially exceeds about 10% by weight of the total weight of the suspension, characterized by improved fluidity and substantial stability of antibiotic potency when stored under ordinary conditions, that comprises additionally, dissolved in the aqueous component of the suspension in a proportion by weight within the range 0.1% to 1%, a purified salt of a bile acid derived from hydrolyzed ox-bile.

5. An aqueous suspension comprised of finely divided particles of the procaine salt of penicillin in which the proportion of salt present in the suspension materially exceeds about 10% by weight of the total weight of the suspension, characterized by improved fluidity and substantial stability of antibiotic potency when stored under ordinary conditions, that comprises additionally, dissolved in the aqueous component of the suspension in a proportion by weight within the range 0.1% to 1%, a purified alkali-metal salt of a bile acid derived from hydrolyzed ox-bile.

6. The aqueous suspension as defined in claim 5 wherein the alkali-metal salt is sodium desoxycholate.

References Cited in the file of this patent

UNITED STATES PATENTS

| 1,483,152 | Altwegg | Feb. 12, 1924 |
| 2,055,083 | Klein | Sept. 22, 1936 |
| 2,485,253 | Berczeller | Oct. 18, 1949 |
| 2,519,112 | Coghill | Aug. 15, 1950 |
| 2,694,665 | Himelick | Nov. 16, 1954 |

FOREIGN PATENTS

| 658,467 | Great Britain | Oct. 10, 1951 |
| 669,709 | Great Britain | Apr. 9, 1952 |

OTHER REFERENCES

Marini: "Metodos Modernos De Solubilizacion De Medicamentos Organicos." Annales de la Asociacion de Quimica y Farmacia del Uruguay, vol. 50, July 1948, pp. 3–17, esp. at pp. 15 and 16.

Mukherjee et al.: "Solubilization of Quinine by Bile Salts," J. Am. Ph. Assn., Sci. Ed., 1947, pp. 314–316.